Patented Dec. 30, 1952

2,623,872

UNITED STATES PATENT OFFICE 2,623,872

BIS-BENZENE-AZO-1.5 DIHYDROXY-NAPHTHALENES

Valentin Kartaschoff and Ernest Merian, Basel, Switzerland, assignors to Sandoz Limited, Basel, Switzerland, a Swiss firm No Drawing. Application September 26, 1949, Serial No. 117,953. In Switzerland October 12, 1948

3 Claims. (Cl. 260—185)

In U. S. patent application Ser. No. 729,401, filed on February 18, 1947 (now abandoned), and in U. S. patent application Ser. No. 120,597, filed on October 10, 1949 (now U. S. Patent No. 2,553,048), a method is described according to which it is possible to prepare halogenated naphthoquinone imines by treating the reduction products of αα-dinitronaphthalenes with halogenating agents. The resultant compounds are halogenated naphthoquinone imines. In other words, oxygen-containing groups are introduced into the free α-positions of naphthalene containing already nitrogen containing groups in the 1- and 5-positions of the nuclei associated with the step of halogenation at the beginning or during the different reaction periods.

In U. S. patent application Ser. No. 34,553, filed on June 22, 1948 (now U. S. Patent No. 2,538,005), a method is described according to which the compounds of said U. S. patent application Ser. No. 729,401 can be hydrolysed to yield halogenated 5.8-dihydroxy-1.4-naphthoquinone-1-imines.

We have now found a new method for the production of the said naphthoquinone imines of the general formula

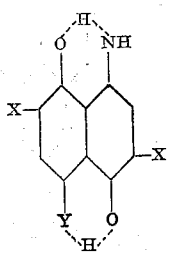

wherein Y stands for —O— or —NH— and each X stands for hydrogen, bromine or chlorine. We found that the same can be prepared, if at least one nitrogen-containing reduceable group is introduced in the free α-positions of 1.5-dihydroxy-naphthalene, the β-positions of which may be substituted for instance by halogen atoms, this step being followed by a reduction and an oxidation step of the resulting compound. If it is desired to prepare halogenated derivatives, the halogenation step may also be carried out after the introduction of the said nitrogen-containing group.

As starting compounds for the preparation of these naphthoquinone imines there are preferably used derivatives of the general formula

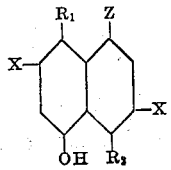

wherein each X stands for hydrogen, bromine or chlorine, Z stands for —OH or =O, R1 stands for —N=N-aryl or —NO2 and R2 stands for —N=N-aryl or =O. These starting products may be produced for instance in the case of 4.8-bis-benzene-azo-2.6-dibromo-1.5-dihydroxy-naphthalene and of 4.8-bis-benzene-azo-2.6-dichloro-1.5-dihydroxy-naphthalene by coupling 1.5-dihydroxy-naphthalene with diazo compounds, the resulting 4.8-bis-aryl-azo-1.5-dihydroxynaphthalenes being halogenated before or after the coupling operation or for instance in the case of 8-nitro-2.6-dibromo-5-hydroxy-1.4-naphthoquinone, by halogenating 1.5-dihydroxy-naphthalene followed by nitrosation or nitration of the derivatives thus obtained.

These starting compounds can be reduced, e. g. with tin chloride in hydrochloric acid, with zinc dust, with iron according to the method of Béchamp, with hydrobromic and hydrochloric acid in sulfuric acid or nitrobenzene medium or with hydrogen in the presence of hydrogenating catalysts such as Raney nickel. In this way halogenated or unhalogenated 1.5-diamino-4.8-dyhydroxynaphthalenes and 1-amino-4.5.8-trihydroxynaphthalenes are obtained, which can be transformed into naphthoquinone imines by oxidizing agents.

The formulae used in the present specification show that the two nitrogen containing groups present in the positions 1 and 5 of the said naphthoquinone imines do not, in fact, possess a different chemical reactibility. As a matter of fact the formula for the so-called naphthazarine intermediate which is also known in the literature as 5-amino-8-hydroxy-1.4-naphthoquinone-1-imine may preferably be written in the following manner:

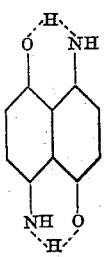

This formula shows that the two nitrogen-containing groups are absolutely identical, which can be proved by the fact that the said compound reacts neither as amine nor as naphthol nor as quinone. Since there is no existing nomenclature for this improved formula we will use in the present specification one of the conventional expressions such as for instance "5-amino-8-hydroxy-1.4-naphthoquinone-1-imine." The same is true also of its derivatives mentioned hereinafter.

The reaction course according to the present invention may be formulated e. g. as follows:

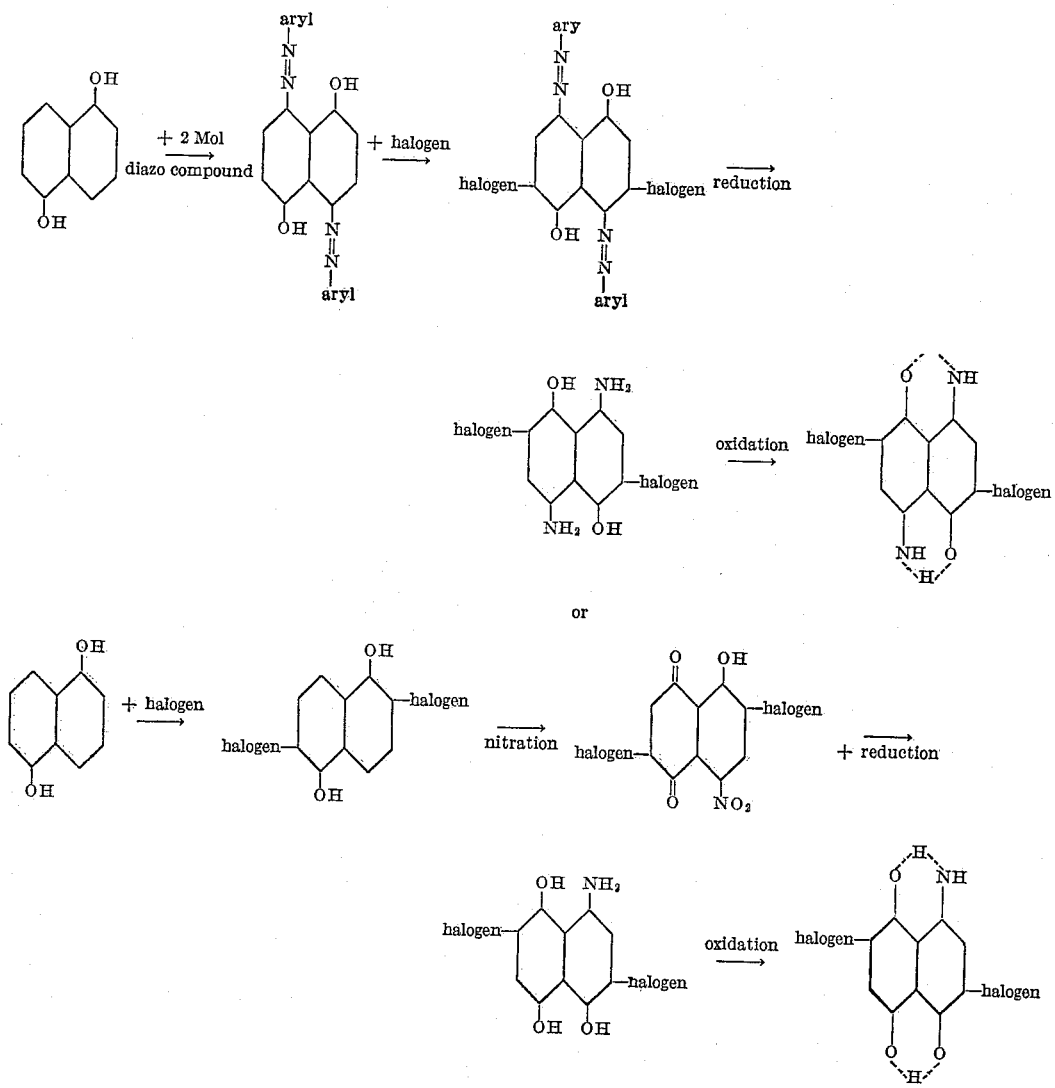

The resulting compounds are violet to blue coloured naphthoquinone imines which are generally insoluble in water and are soluble in ethanol with a red, violet or pure blue coloration and in concentrated sulfuric acid with a yellow, brown, olive or red coloration. They can be used as dyestuffs and also as intermediate products for the manufacture thereof.

The following examples illustrate how the invention may be carried out, but are in no way limitative. Parts are by weight and temperatures are in degrees centigrade.

*Example 1*

65 parts of 4.8-bis-benzene-azo-1.5-dihydroxy-naphthalene are powdered and dispersed in a mixture consisting of 1560 parts of isopropanol and 1000 parts of water. To this suspension 500 parts of tin chloride dissolved in 1150 parts of hydrochloric acid of 19.5° Bé. are added, the whole mass being well stirred up at room temperature for 2 hours. After this time the now colourless suspension is filtered off and the residue is dissolved in 670 parts of caustic soda solution. Air is passed through and, after some time, the whole quantity of resulting 5-amino-8-hydroxy-1.4-naphthoquinone-1-imine of the formula precipitates and is filtered off. By crystallisation from ten times the quantity of glacial acetic acid the compound may be purified. It forms needles having a greenish lustre, being soluble in organic solvents with a violet coloration and in concentrated sulfuric acid with a pure yellow coloration, the maxima of absorption in ethanol being at 610, 562 and 521 mμ.

*Example 2*

37 parts of 4.8-bis-benzene-azo-1.5-dihydroxynaphthalene are halogenated in 400 parts of glacial acetic acid with 35 parts of bromine at 80° in presence of 20 parts of sodium acetate. After 1 hour the whole is poured into 1000 parts of water and the resulting suspension of 4.8-bis-benzene-azo-2.6-dibromo-1.5-dihydroxy-naphthalene of the formula

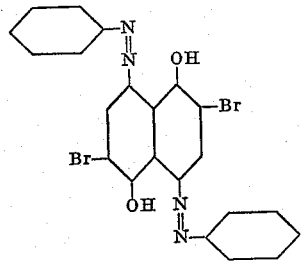

is reduced by adding a solution of 300 parts of tin chloride in 700 parts of hydrochloric acid of 19.5° Bé. After stirring for 2 hours the reaction product is filtered off, dissolved in 1500 parts of water containing 270 parts of caustic soda solution and air passed through. After 2 hours the deep blue suspension is acidified by means of 270 parts of glacial acetic acid and filtered off. The filter cake consists of 3.7-dibromo-5-amino-8-hydroxy-1.4-naphthoquinone-1-imine of the formula

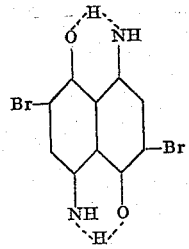

which is soluble in organic solvents with a pure greenish blue, in concentrated sulfuric acid with a pure yellow coloration, the absorption maxima in ethanol being at 630 and 579 mμ. The compound dyes cellulose ester fibres in pure blue shades of excellent fastness properties to light and to gas fume.

*Example 3*

7.57 parts of 4.8-bis-benzene-azo-1.5-dihydroxynaphthalene are stirred up in 100 parts of nitrobenzene and halogenated at 140° with 6.4 parts of bromine. After 6 hours the mass is filtered from a small residue and the nitrobenzene is distilled off from the liquid phase at a reduced pressure, 3.7-dibromo-5-amino-8-hydroxy-1.4-naphthoquinone-1-imine which is identical with the product of Example 2 being thus directly produced.

*Example 4*

106 parts of 2.6-dibromo-1.5-dihydroxy-naphthalene are introduced at a temperature below —5° into 1250 parts of a mixture of 1 part of concentrated sulfuric acid and 1 part of 100% nitric acid. The whole is stirred for 24 hours at this temperature, then poured onto ice-water, filtered and washed free from acid and dried. A red-brown product is obtained, which contains 3.76% of nitrogen and 37.77% of bromine (theory for 8-nitro-2.6-dibromo-5-hydroxy-1.4-naphthoquinone 3.72% of nitrogen and 42.5% of bromine).

20.4 parts of this compound are stirred up in a mixture of 600 parts of isopropanol and 300 parts of water. 150 parts of tin chloride in 345 parts of hydrochloric acid of 19.5° Bé. are added and, after 2 hours, the greyish white precipitate is filtered off. It is dissolved in a mixture of 1000 parts of water and 135 parts of caustic soda solution of 36° Bé. By passing air through the brown solution the product is precipitated. The suspension is acidified by means of 100 parts of glacial acetic acid, filtered and washed free from acid. Thus 3.7-dibromo-5.8-dihydroxy-1.4-naphthoquinone-1-imine of the formula

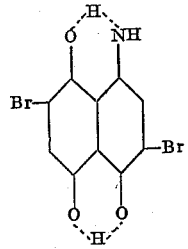

is obtained in a good yield, which is soluble in organic solvents with a violet coloration and in concentrated sulfuric acid with a carmine coloration, the adsorption maxima in ethanol being at 630, 579 and 534 mμ and in concentrated sulfuric acid at 584, 540 and 510 mμ. The compound dyes cellulose ester fibres in pure violet shades. The same derivative is obtained when zinc dust is used for the reduction, as well as with iron according to the method of Béchamp.

*Example 5*

18.1 parts of the intermediate product of Example 4, which probably consists of 8-nitro-2.6-dibromo-5-hydroxy-1.4-naphthoquinone, are stirred up in 500 parts of glacial acetic acid. 2 parts of fine dispersed nickel is added and a stream of hydrogen is passed through. Decoloration takes place which shows the formation of the yellowish white 1-amino-3.7-dibromo-4.5.8-trihydroxy-naphthalene. This compound is oxidised with air to the violet 3.7-dibromo-5.8-dihydroxy-1.4-naphthoquinone-1-imine, which can be isolated by pouring it onto water followed by a filtration step.

*Example 6*

To a suspension of 97 parts of 4.8-bis-benzene-azo-1.5-dihydroxy-naphthalene in diluted caustic soda fine paste of 64 parts of chlorinated lime in 200 parts of water is added at a temperature of 0°. The chlorination is at its end as soon as a sample, being reduced with tin chloride and hydrochloric acid and dissolved in diluted caustic soda, turns, when oxidised under the influence of air and acidified with glacial acetic acid, from violet to a greenish blue. The precipitate consists now of 2.6-dichloro-4.8-bis-benzene-azo-1.5-dihydroxynaphthalene of the formula

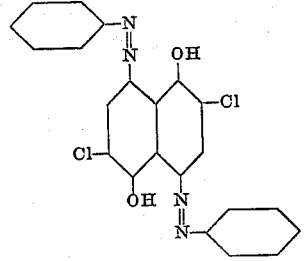

which is nearly insoluble. The whole reaction mass is acidified by addition of 500 parts of concentrated hydrochloric acid. The line goes into solution in form of calcium chloride and the suspension is reduced by means of 250 parts of tin chloride in 575 parts of concentrated hydrochloric acid. Addition of dispersing agent facilitates the reduction. After 5 hours the coloration of a sample dissolved in concentrated sulfuric acid has changed from bluish green to orange. The precipitate is now filtered off and dissolved in a mixture of 2000 parts of water and 267 parts of caustic soda solution while passing a stream of air therethrough. After the reoxidation the suspension is acidified with glacial acetic acid, filtered, washed and dried. The resulting 3.7-dichloro-5-amino-8-hydroxy-1.4-naphthoquinone-1-imine of the formula

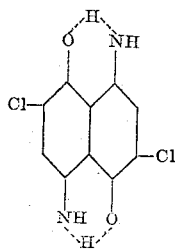

is a dark blue powder, which is soluble in organic solvents with a blue coloration and in concentrated sulfuric acid with a yellowish olive coloration. It dyes cellulose ester fibers in blue shades.

*Example 7*

16 parts of 2.6-dibromo-1.5-dihydroxy-naphthalene is well stirred up in a mixture consisting of 100 parts of water, 100 parts of ice and 135 parts of caustic soda solution. To this suspension is added a solution of diazotised aniline corresponding to 11.5 parts of aniline made in the usual manner. Coupling occurs immediately and the resulting 2.6-dibromo-4.8-bis-benzene-azo-1.5-dihydroxynaphthalene can be filtered off after some stirring from the still alkaline reaction medium. The washed compound is reduced and oxidised in the same way as described in Example 2. The resultant halogenated naphthoquinone-imine is identical with that of Example 2.

*Example 8*

37 parts of 4.8-bis-benzene-azo-1.5-dihydroxynaphthalene are dissolved in 735 parts of concentrated sulfuric acid. Some iodine is added and the whole is warmed up to 60° when 50 parts of bromine are dropped thereinto. The temperature is slowly raised to 80°. After 12 hours the solution is no longer green but brown and a sample dissolved in ethanol is blue after filtration and shows the absorption maxima at 630 and 579 mμ. The whole reaction mass is now cooled to 20° and 250 parts of water are dropwise added thereto. Attention must be paid to the fact that the temperature does not rise above 40°. By this reaction a brown product is precipitated from which a brown solution is filtered. The filtrate is poured onto ice-water, whereby 3.7-dibromo-5-amino-8-hydroxy-1.4-naphthoquinone-1-imine is precipitated. It is filtered off, washed free from acid and dried.

If during the addition of water, the temperature is raised to above 50°, 3.7-dibromo-5.8-dihydroxy-1.4-naphthoquinone-1-imine will be obtained.

*Example 9*

37 parts of 4.8-bis-benzene-azo-1.5-dihydroxynaphthalene are dissolved in 735 parts of concentrated sulfuric acid. Some iodine is added and the whole is warmed up to 80° when a current of dry chlorine is passed therethrough and the whole is irradiated by means of an ultraviolet lamp. After 12 hours the solution is no longer green but brown and a sample dissolved in ethanol shows a reddish blue color after filtration. The whole reaction mass is now cooled to 20° and 250 parts of water are dropped in. As in Example 8 attention must be paid to the fact that the temperature does not rise above 40°, if one does not want to obtain 3.7-dichloro-5.8-dihydroxy-1.4-naphthoquinone-1-imine as resulting product. The 3.7-dichloro-5-amino-8-hydroxy-1.4-naphthoquinone-1-imine is worked up in an analogous way as described in Example 8.

What we claim is:

1. A compound corresponding to the formula

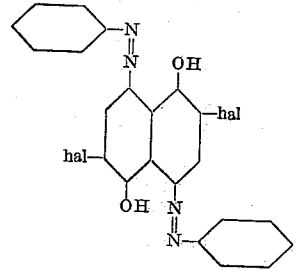

wherein hal stands for a member selected from the group consisting of chlorine and bromine.

2. 4.8-bis-benzene-azo-2.6-dibromo-1.5-dihydroxy-naphthalene.

3. 4.8-bis-benzene-azo-2.6-dichloro-1.5-dihydroxy-naphthalene.

VALENTIN KARTASCHOFF.
ERNEST MERIAN.

REFERENCES CITED

The following references are of record in the file of this patent:

UNITED STATES PATENTS

| Number | Name | Date |
| --- | --- | --- |
| 741,936 | Schleicher et al. | Oct. 20, 1903 |
| 2,230,099 | Zwilgmeyer | Jan. 28, 1941 |
| 2,422,089 | Fletcher | June 10, 1947 |
| 2,538,005 | Kartaschoff | Jan. 16, 1951 |